(12) United States Patent
Nakamura et al.

(10) Patent No.: US 11,809,049 B2
(45) Date of Patent: Nov. 7, 2023

(54) DISPLAY DEVICE

(71) Applicant: Japan Display Inc., Tokyo (JP)

(72) Inventors: Tenfu Nakamura, Tokyo (JP); Kojiro Ikeda, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/106,693

(22) Filed: Feb. 7, 2023

(65) Prior Publication Data

US 2023/0185137 A1 Jun. 15, 2023

Related U.S. Application Data

(63) Continuation of application No. 17/474,205, filed on Sep. 14, 2021, now Pat. No. 11,604,388, which is a (Continued)

(30) Foreign Application Priority Data

Mar. 14, 2019 (JP) ................................ 2019-047367

(51) Int. Cl.
*G02F 1/1343* (2006.01)
*G02F 1/1339* (2006.01)
*G02F 1/1334* (2006.01)

(52) U.S. Cl.
CPC ...... *G02F 1/134309* (2013.01); *G02F 1/1334* (2013.01); *G02F 1/13396* (2021.01)

(58) Field of Classification Search
CPC ......... G02F 1/133371; G02F 1/133616; G02F 1/133615; G02F 1/13396; G02F 1/1334; G02F 1/134309
See application file for complete search history.

(56) References Cited

U.S. PATENT DOCUMENTS 8,033,706 B1 * 10/2011 Kelly .................. G02B 6/0043
362/617
10,168,577 B2 1/2019 Wang et al.
(Continued)

FOREIGN PATENT DOCUMENTS

JP 11-95228 A 4/1999
JP 11-249141 A 9/1999
(Continued)

OTHER PUBLICATIONS

International Search Report issued in International Patent Application PCT/JP2019/040307 dated Dec. 3, 2019. 5 pages.
(Continued)

*Primary Examiner* — Mariam Qureshi
(74) *Attorney, Agent, or Firm* — K&L Gates LLP

(57) ABSTRACT

According to one embodiment, a display device includes a first substrate including a pixel electrode, a second substrate including a common electrode, a liquid crystal layer located between the first substrate and the second substrate and containing polymer and liquid crystal molecules, and a light emitting element opposed to an end surface of the second substrate, the common electrode being separated from the pixel electrode by a first distance, at a first position, the common electrode being separated from the pixel electrode by a second distance, at a second position more separated from the light emitting element than the first position, the second distance being smaller than the first distance.

11 Claims, 13 Drawing Sheets

Related U.S. Application Data continuation of application No. PCT/JP2019/040307, filed on Oct. 11, 2019.

(56) References Cited

U.S. PATENT DOCUMENTS

| | | |
|---|---|---|
| 2011/0249221 A1 | 10/2011 | Uchida et al. |
| 2012/0099060 A1 | 4/2012 | Matsumoto et al. |
| 2012/0314177 A1 | 12/2012 | Hyodo et al. |
| 2013/0286312 A1 | 10/2013 | Choi et al. |
| 2018/0348553 A1 | 12/2018 | Koide |
| 2020/0183222 A1* | 6/2020 | Yoon ................. G09G 3/342 |

FOREIGN PATENT DOCUMENTS

| | | |
|---|---|---|
| JP | 2000-066219 A | 3/2000 |
| JP | 2009-229685 A | 10/2009 |
| JP | 2012-151081 A | 9/2012 |
| WO | WO2016/176961 A1 | 11/2016 |

OTHER PUBLICATIONS

Written Opinion issued in International Patent Application PCT/JP2019/040307 dated Dec. 3, 2019. 6 pages.

\* cited by examiner

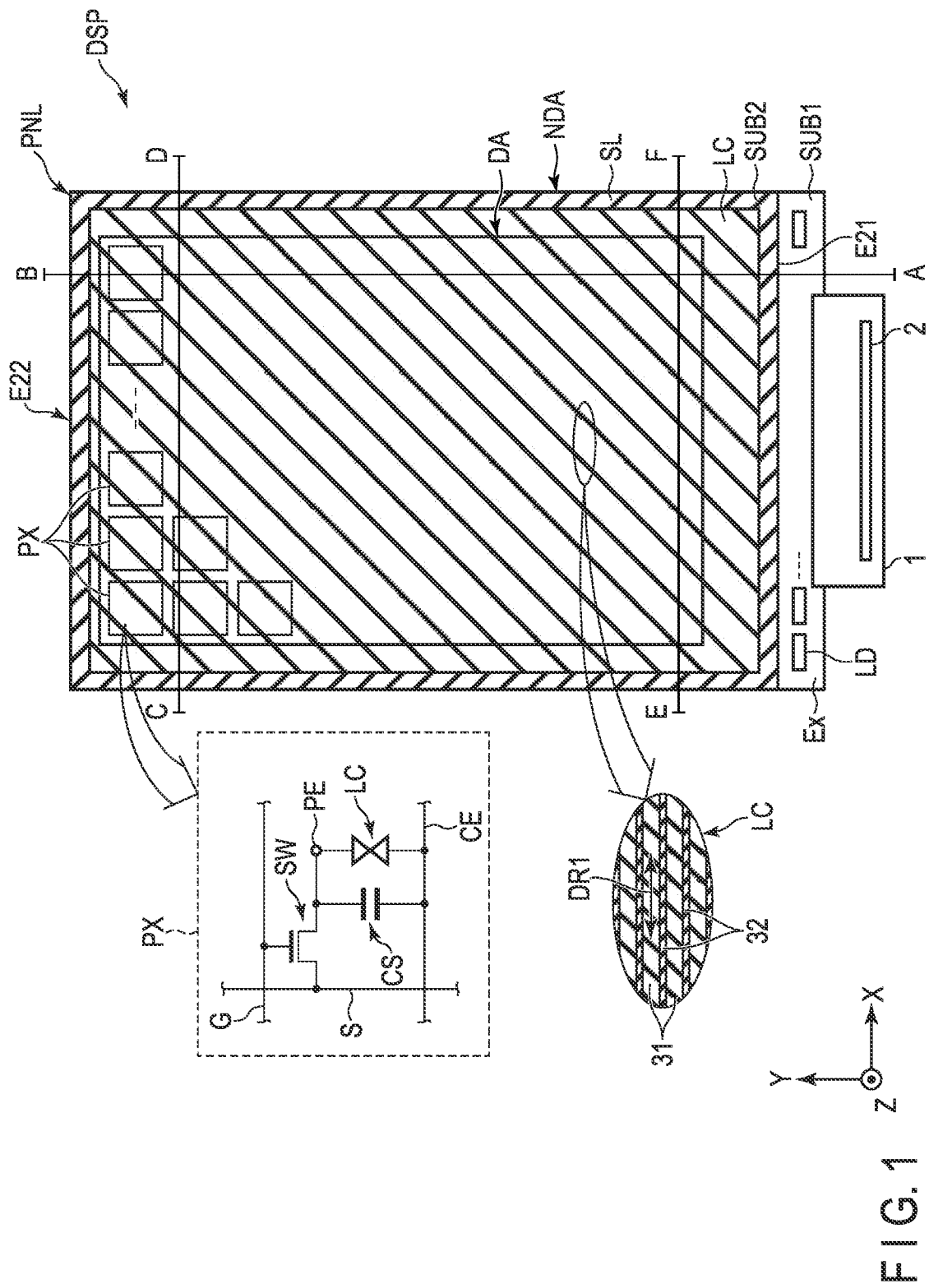
F I G. 1

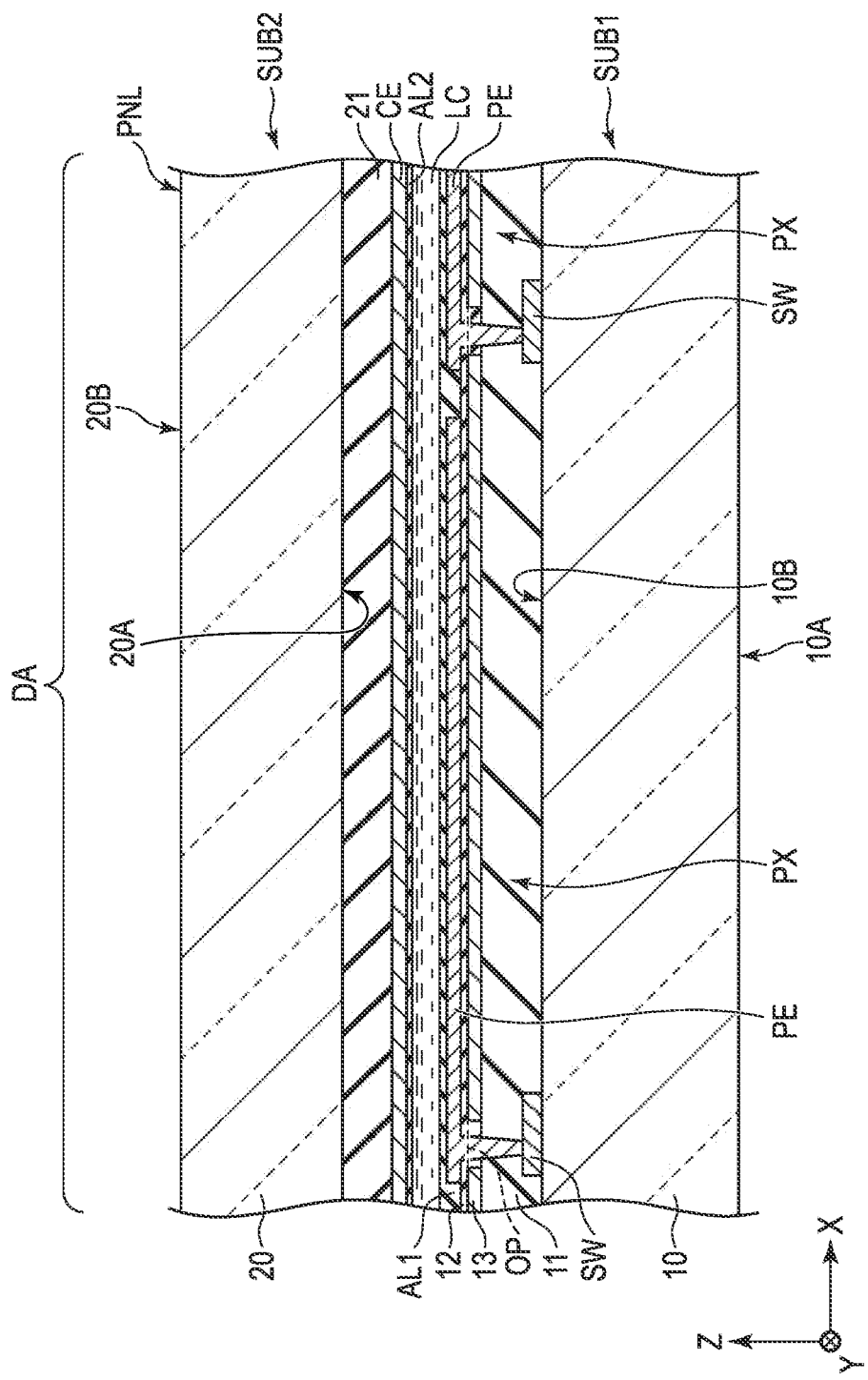
F I G. 2

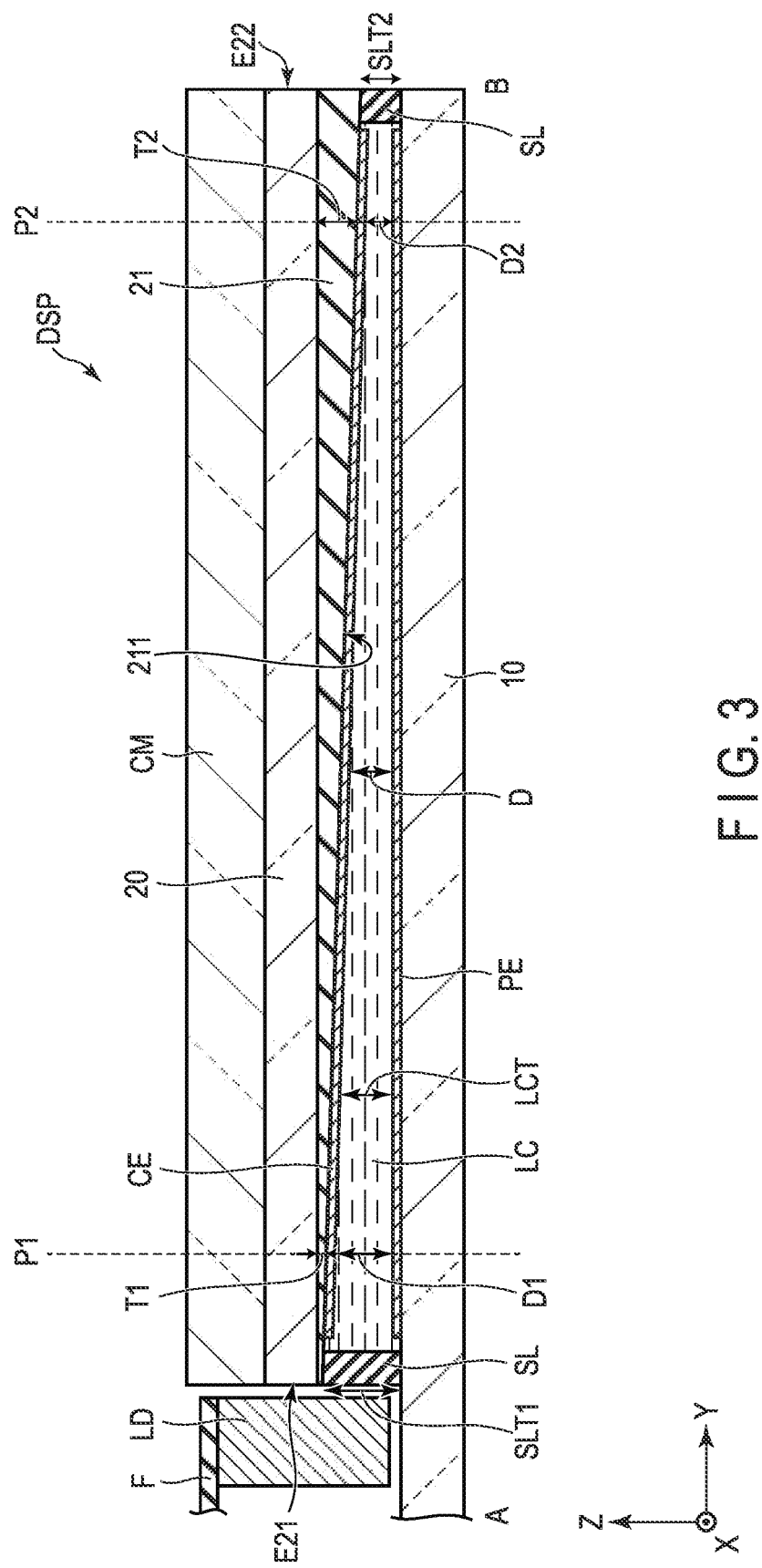
F I G. 3

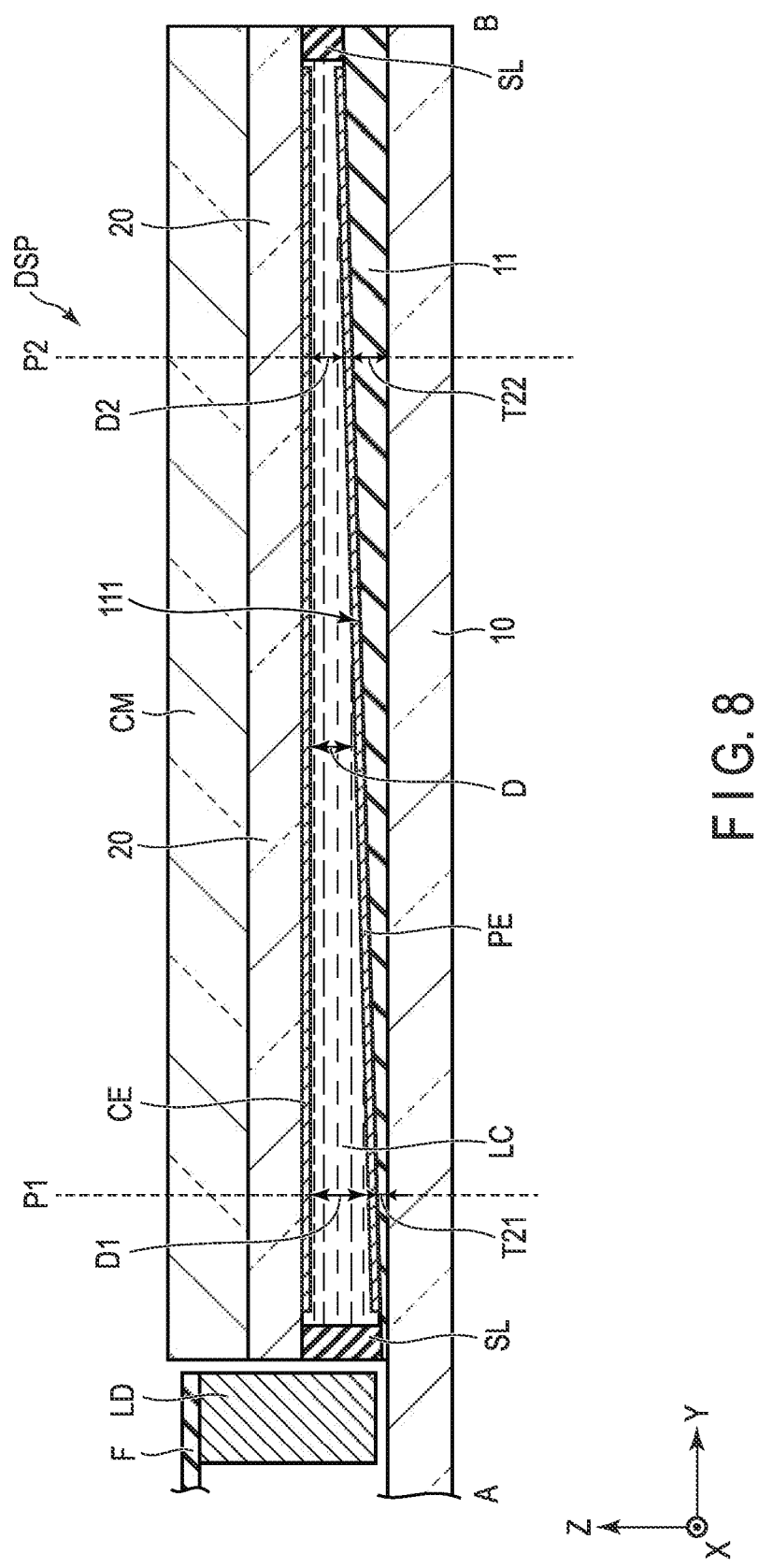
F I G. 8

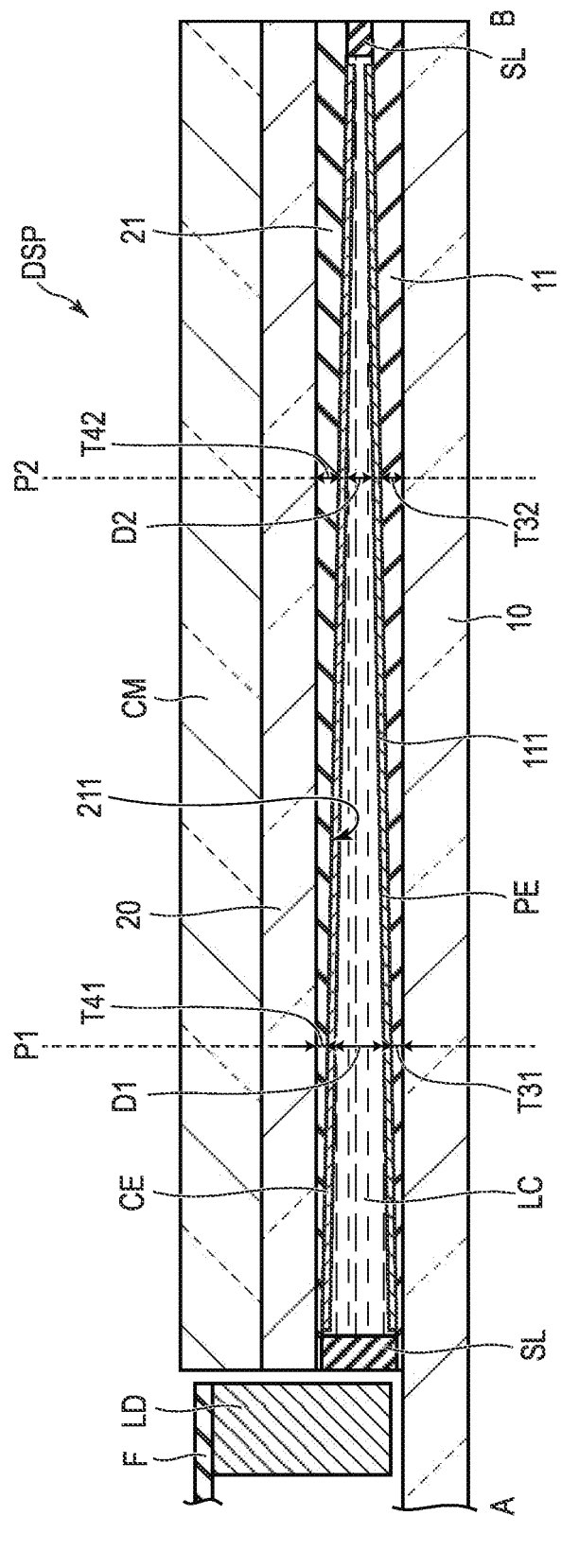
F I G. 10

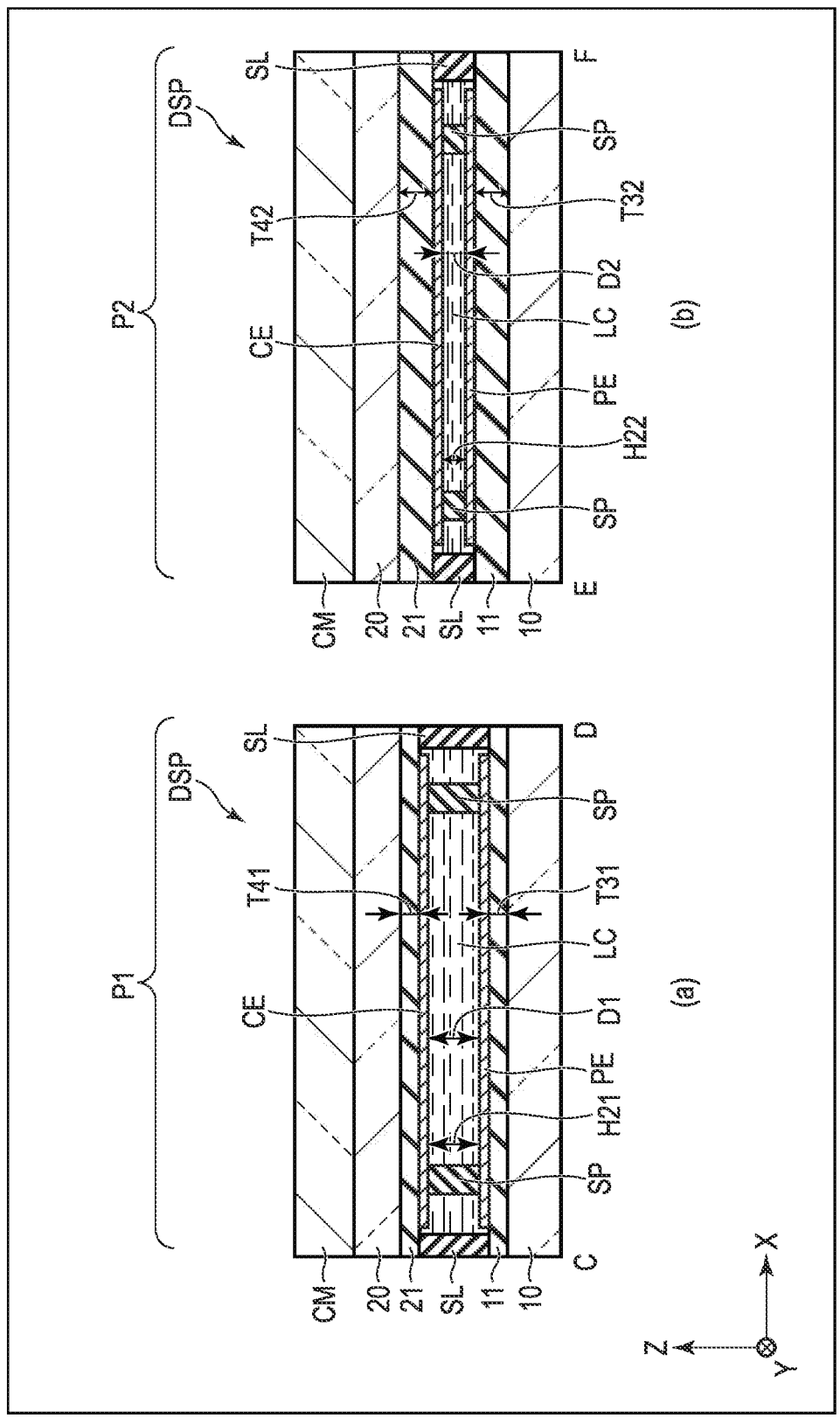
F I G. 11

F.I.G. 12

DISPLAY DEVICE

CROSS-REFERENCE TO RELATED APPLICATIONS

This application is a continuation of U.S. patent application Ser. No. 17/474,205, filed Sep. 14, 2021, which is a continuation of PCT Application No. PCT/JP2019/040307, filed Oct. 11, 2019 and based upon and claiming the benefit of priority from Japanese Patent Application No. 2019-047367, filed Mar. 14, 2019, the entire contents of all of which are incorporated herein by reference.

FIELD

Embodiments described herein relate generally to a display device.

BACKGROUND

A display device that switches a transparent state and a scattered state using a polymer dispersed liquid crystal (PDLC) has been proposed. This is a technique for switching a transparent state and a scattered state by partially applying a voltage to PDLC, for the purpose of preventing reflections. The edge light method of arranging a light source at an end portion of a light guide is employed by a transparent display device using PDLC. However, a problem arises that when the edge light method is used in the PDLC display device the luminance is decreased as the distance from the light source increases.

SUMMARY

The present application generally relates to a display device.

According to one embodiment, a display device includes a first substrate including a pixel electrode, a second substrate including a common electrode, a liquid crystal layer located between the first substrate and the second substrate and containing polymer and liquid crystal molecules, and a light emitting element opposed to an end surface of the second substrate, the common electrode being separated from the pixel electrode by a first distance, at a first position, the common electrode being separated from the pixel electrode by a second distance, at a second position more separated from the light emitting element than the first position, the second distance being smaller than the first distance.

BRIEF DESCRIPTION OF THE DRAWINGS

FIG. 1 is a plan view showing an example of a display device according to the embodiments.

FIG. 2 is a cross-sectional view showing a display portion of a display panel shown in FIG. 1.

FIG. 3 is a cross-sectional view schematically showing the display device taken along line A-B shown in FIG. 1.

FIG. 8 is a cross-sectional view showing a fourth configuration example of the display device.

FIG. 10 is a cross-sectional view showing a fifth configuration example of the display device.

FIG. 11 is a cross-sectional view schematically showing the display device taken along line C-D and line E-F shown in FIG. 1.

DETAILED DESCRIPTION

Figure 4:
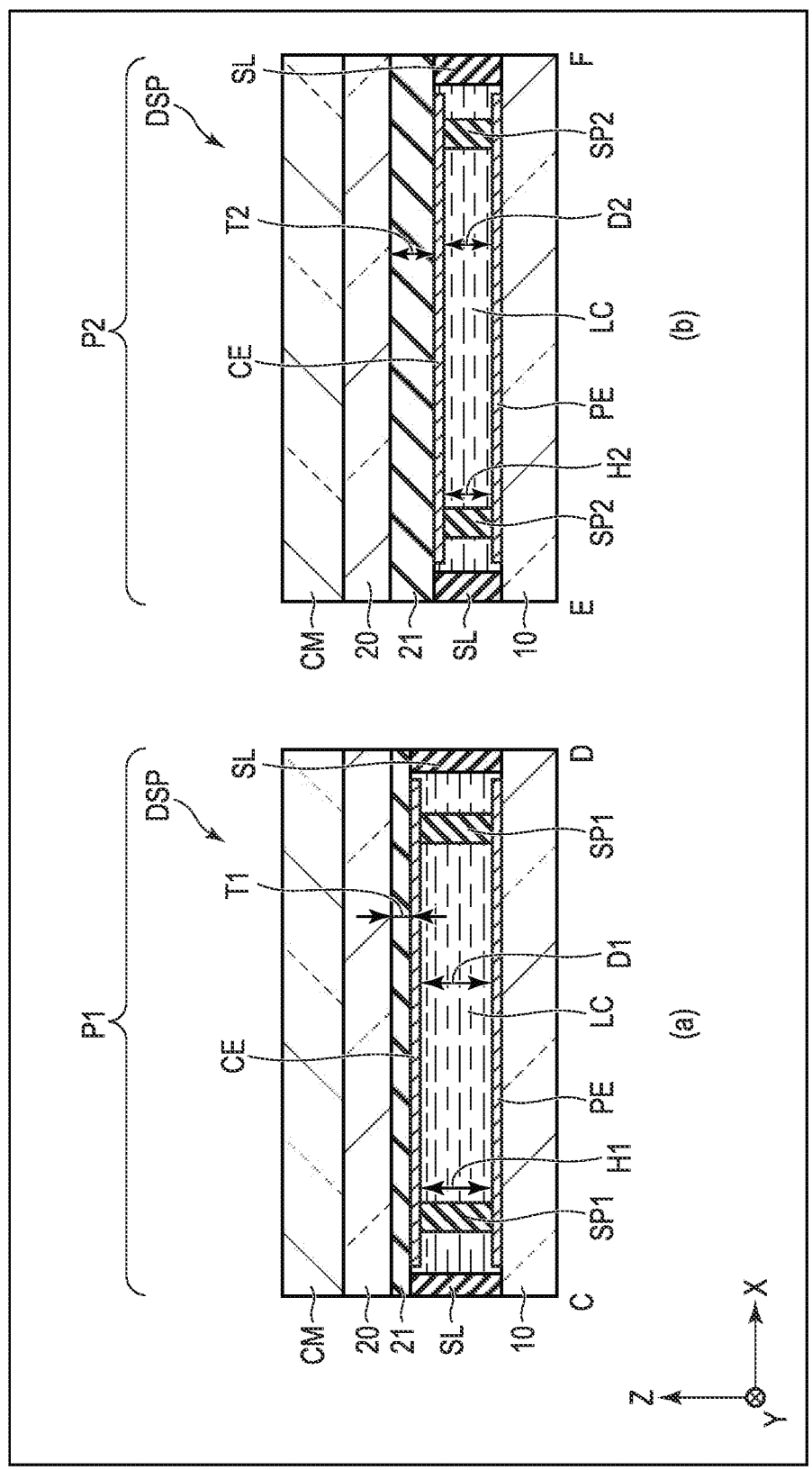
FIG. 4 is a cross-sectional view schematically showing the display device taken along line C-D and line E-F shown in FIG. 1.

In general, according to one embodiment, a display device comprises a first substrate including a pixel electrode, a second substrate including a common electrode, a liquid crystal layer located between the first substrate and the second substrate and containing polymer and liquid crystal molecules, and a light emitting element opposed to an end surface of the second substrate, the common electrode being separated from the pixel electrode by a first distance, at a first position, the common electrode being separated from the pixel electrode by a second distance, at a second position more separated from the light emitting element than the first position, the second distance being smaller than the first distance.

According to another embodiment, a display device comprises a first substrate including a first electrode, a second substrate having a second electrode, a first end surface, and a second end surface on an opposite side to the first end surface, a liquid crystal layer located between the first substrate and the second substrate, and a light emitting element opposed to the first end surface, the second substrate having a first position and a second position located between the first position and the second end surface, a distance between the first electrode and the second electrode at the first position being larger than a distance between the first electrode and the second electrode at the second position.

According to another embodiment, a display device comprises a first substrate, a second substrate having a first end surface and a second end surface on an opposite side to the first end surface, a liquid crystal layer sealed between the first substrate and the second substrate by a seal, and a light emitting element opposed to a seal located on the first end surface side, in a direction from the first end surface to the second end surface, a thickness of a seal located on the first end surface side being larger than a thickness of a seal located on the second end surface.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Configuration Example

FIG. 1 is a plan view showing an example of a display device DSP according to the embodiments.

For example, the first direction X, the second direction Y, and the third direction Z are orthogonal to each other but may intersect at an angle other than 90 degrees. The first direction X and the second direction Y correspond to the directions parallel to the surface of a substrate which constitutes the display device DSP, and the third direction Z corresponds to the thickness direction of the display device DSP. In the present specification, a direction from a first substrate SUB1 to a second substrate SUB2 is referred to as an upward direction (or, more simply, upwardly) and a direction from the second substrate SUB2 to the first substrate SUB1 is referred to as a downward direction (or, more simply, downwardly). According to "a second member on/above a first member" and "a second member under/below a first member", the second member may be in contact with the first member or may be separated from the first member. An observation position at which the display device DSP is observed is assumed to be located on the tip side of the arrow indicating the third direction Z, and viewing from the observation position toward the X-Y plane defined by the first direction X and the second direction Y is called a planar view.

In the embodiments, a liquid crystal display device employing polymer dispersed liquid crystal will be described as an example of the display device DSP. The display device DSP comprises a display panel PNL, a wiring board 1, an IC chip 2, and a light emitting element LD.

The display panel PNL comprises a first substrate SUB1, a second substrate SUB2, a liquid crystal layer LC, and a seal SL. The first substrate SUB1 and the second substrate SUB2 are formed in a flat plate parallel to the X-Y plane. The first substrate SUB1 and the second substrate SUB2 are overlaid in planar view. The first substrate SUB1 and the second substrate SUB2 are bonded to each other by the seal SL. The liquid crystal layer LC is held between the first substrate SUB1 and the second substrate SUB2, and is sealed by the seal SL. In FIG. 1, the liquid crystal layer LC and the seal SL are represented by different hatch lines.

As schematically enlarged in FIG. 1, the liquid crystal layer LC comprises polymer dispersed liquid crystal containing polymer 31 and liquid crystal molecules 32. For example, the polymer 31 is liquid crystal polymer. The polymer 31 is formed in a stripe shape extending in one direction. For example, an extending direction DR1 of the polymer 31 is a direction parallel to the first direction X. The liquid crystal molecules 32 are dispersed in gaps of the polymer 31 and aligned such that their major axes extend in the first direction X. The polymer 31 and the liquid crystal molecules 32 have optical anisotropy or refractive anisotropy. The response performance of the polymer 31 to the electric field is lower than the response performance of the liquid crystal molecules 32 to the electric field.

For example, the orientation of alignment of the polymer 31 is hardly varied irrespective of the presence or absence of the electric field. In contrast, the orientation of alignment of the liquid crystal molecules 32 is varied in accordance with the electric field in a state in which a voltage higher than or equal to a threshold value is applied to the liquid crystal layer LC. In a state in which the voltage is not applied to the liquid crystal layer LC, optical axes of the polymer 31 and the liquid crystal molecules 32 are parallel to one another and the light made incident on the liquid crystal layer LC is transmitted without being substantially scattered in the liquid crystal layer LC (transparent state). In a state in which the voltage is applied to the liquid crystal layer LC, optical axes of the polymer 31 and the liquid crystal molecules 32 intersect one another and the light made incident on the liquid crystal layer LC is scattered in the liquid crystal layer LC (scattered state).

The display panel PNL comprises a display portion DA on which an image is displayed and a non-display portion NDA in a bezel shape surrounding the display portion DA. The seal SL is located at the non-display portion NDA. The display portion DA comprises pixels PX arrayed in a matrix in the first direction X and the second direction Y.

As enlarged in FIG. 1, each pixel PX comprises a switching element SW, a pixel electrode (first electrode) PE, a common electrode (common electrode) CE, a liquid crystal layer LC and the like. The switching element SW is composed of, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each pixel electrode PE is opposed to the common electrode CE in the third direction Z, and drives the liquid crystal layer LC (particularly, liquid crystal molecules 32) by an electric field which is produced between the pixel electrode PE and the common electrode CE. A capacitor CS is formed, for example, between an electrode of the same electric potential as the common electrode CE and an electrode of the same potential as the pixel electrode PE. The first substrate SUB1 includes a plurality of pixel electrodes PE. The second substrate SUB2 includes at least one common electrode CE.

The wiring board 1 is electrically connected to an extended portion Ex of the first substrate SUB1. The wiring board 1 is a foldable flexible printed circuit board. The IC chip 2 is electrically connected to the wiring board 1. The IC chip 2 incorporates, for example, a display driver which outputs a signal necessary for image display, and the like. The IC chip 2 may be electrically connected to the extended portion Ex. The wiring board 1 and the IC chip 2 often read signals from the display panel PNL but mainly function as signal sources which supply signals to the display panel PNL.

The light emitting element LD is overlaid on the extended portion Ex. A plurality of light emitting elements LD are spaced apart and arranged in the first direction X. These light emitting elements LD are opposed to an end surface (first end surface) E21 of the second substrate SUB2 and emit light toward the end surface E21. The second substrate SUB2 has an end surface (second end surface) E22 on the side opposed to the end surface E21, and the light emitted from the light emitting elements LD reaches the end surface E22.

FIG. 2 is a cross-sectional view showing the display portion DA of the display panel PNL shown in FIG. 1. The liquid crystal layer LC is provided between the first substrate SUB1 and the second substrate SUB2.

The first substrate SUB1 comprises a transparent substrate (second transparent substrate) 10, an organic insulating film (second organic insulating film) 11, a capacitive insulating film 12, a capacitive electrode 13, the switching element SW, and a pixel electrode PE, and an alignment film AL1.

The transparent substrate 10 comprises a main surface 10A and a main surface 10B on a side opposite to the main surface 10A. The switching element SW is arranged on the main surface 10B side. The switching element SW may be a bottom-gate type switching element having a gate electrode located under the semiconductor layer or may be a top-gate type switching element having a gate electrode located on the semiconductor layer. The semiconductor layer is formed of, for example, amorphous silicon, but may be formed of polycrystalline silicon or an oxide semiconductor.

The organic insulating film 11 covers the switching element SW. In addition, the organic insulating film 11 is located between the transparent substrate 10 and the pixel electrode PE. The scanning line G and the signal line S shown in FIG. 1 are arranged between the transparent substrate 10 and the organic insulating film 11, but their illustration is omitted. The scanning line G, the signal line S intersecting the scanning line G, the switching element SW electrically connected to the scanning line G and the signal line S, and the organic insulating film 11 overlaid on the switching element SW are located on the transparent substrate 10. The capacitive electrode 13 is arranged between the organic insulating film 11 and the capacitive insulating film 12. The pixel electrode PE is arranged for each pixel PX between the capacitive insulating film 12 and the alignment film AL1. The pixel electrode PE is electrically connected to the switching element SW through an opening portion OP of the capacitive electrode 13. The pixel electrode PE is overlaid on the capacitive electrode 13 through the capacitive insulating film 12 to form the capacitor CS of the pixel PX. The alignment film AL1 covers the pixel electrode PE. The alignment film AL1 is in contact with the liquid crystal layer LC.

The second substrate SUB2 comprises a transparent substrate (first transparent substrate) 20, a common electrode CE, an organic insulating film (first organic insulating film) 21, and an alignment film AL2. The transparent substrate 20 has a main surface 20A and a main surface 20B on a side opposite to the main surface 20A. The main surface 20A of the transparent substrate 20 is opposed to the main surface 10B of the transparent substrate 10. The organic insulating film 21 is provided on the main surface 20A and is located between the transparent substrate 20 and the common electrode CE. The common electrode CE is provided between the liquid crystal layer LC and the organic insulating film 21. The common electrode CE is arranged over the plurality of pixels PX and is opposed to the plurality of pixel electrodes PE in the third direction Z. The alignment film AL2 covers the common electrode CE. In addition, the alignment film AL2 is in contact with the liquid crystal layer LC. The second substrate SUB2 may comprise a light shielding layer immediately above the scanning line G, the signal line S, and the switching element SW.

The transparent substrates 10 and 20 are insulating substrates such as glass substrates or plastic substrates. The organic insulating films 11 and 21 are formed of a transparent insulating material such as acrylic resin. The capacitive insulating film 12 is an inorganic insulating film of silicon nitride or the like. The capacitive electrode 13, the pixel electrodes PE, and the common electrode CE are transparent electrodes formed of a transparent conductive material such as indium tin oxide (ITO) or indium zinc oxide (IZO). For example, the alignment films AL1 and AL2 are subjected to alignment treatment in the first direction X. The alignment treatment may be a rubbing treatment or an optical alignment treatment.

FIG. 3 is a cross-sectional view schematically showing the display device DSP on line A-B shown in FIG. 1. Only main constituent elements of the present invention are shown, and the illustration of the other members is omitted.

A cover member CM is located on the transparent substrate 20. The light emitting element LD is opposed to the cover member CM, the transparent substrate 20, the liquid crystal layer LC, and the seal SL in the second direction Y. The light emitting element LD is opposed to the seal SL located on the end surface E21 side in the direction from the end surface E21 to the end surface E22. In addition, the light emitting element LD is electrically connected to a wiring board F. A light guide may be interposed between the light emitting element LD and the transparent substrate 20. The scattered state of the light incident on the liquid crystal layer LC from the light emitting element LD is changed by the voltage applied between the pixel electrode PE and the common electrode CE.

The first position P1 close to the light emitting element LD and the second position P2 separated from the light emitting element LD from the first position P1 are defined here. The second substrate SUB2 has the first position P1 and the second position P2. The second position P2 is located between the first position P1 and the end surface E22. The organic insulating film 21 has a thickness T1 at the first position P1 and a thickness T2 at the second position P2. The thickness T1 is smaller than the thickness T2. The thickness of the organic insulating film 21 increases as the distance from the light emitting element LD increases. That is, the thickness of the organic insulating film 21 gradually increases from the first position P1 to the second position P2. For this reason, a surface 211 of the organic insulating film 21 on the first substrate SUB1 side is slanted to the transparent substrate 20. Thus, an interelectrode distance D between the common electrode CE and the pixel electrode PE becomes smaller as the distance from the light emitting element LD increases, due to the shape of the organic insulating film 21. At the first position P1, the common electrode CE is separated from the pixel electrode PE by a first distance D1. At the second position P2, the common electrode CE is separated from the pixel electrode PE by a second distance D2. The second distance D2 is smaller than the first distance D1. In other words, the first distance D1 between the pixel electrode PE and the common electrode CE at the first position P1 is larger than the second distance D2 between the pixel electrode PE and the common electrode CE at the second position P2. That is, the distance between the pixel electrode PE and the common electrode CE gradually decreases from the first position P1 to the second position P2. In addition, a thickness SLT1 of the seal SL located on the end surface E21 side is larger than a thickness SLT2 of the seal SL located on the end surface E22 side. A thickness LCT of the liquid crystal layer LC gradually decreases from the end surface E21 to the end surface E22.

In the display device DSP to which the polymer dispersed liquid crystal is applied, the light emitting element LD is located to be opposed to the end surface E21 of the second substrate SUB2. For this reason, the light emitted from the light emitting element LD is absorbed by lines, a light shielding layer, an organic insulating film, or the like, or is used for scattering such that the light is reduced as the distance from the light emitting element LD is increased. That is, the luminance of the display device DSP may decrease from an incident side to an anti-incident side. The incident side corresponds to the side on which the light emitting element LD is located, i.e., the end surface E21 side, and the anti-incident side corresponds to the side opposed to the end surface E21, i.e., the end surface E22 side.

According to the embodiments, the interelectrode distance D between the common electrode CE and the pixel electrode PE decreases as the distance from the light emitting element LD increases, such that the electric field strength between the common electrode CE and the pixel electrode PE increases as the distance from the light emitting element LD increases. For this reason, the decrease in luminance from the incident side to the anti-incident side can be suppressed. The degradation in display quality of the display device DSP can be thereby suppressed.

FIG. 4 is a cross-sectional view schematically showing the display device DSP on lines C-D and E-F shown in FIG. 1. FIG. 4(a) is a cross-sectional view on line C-D. A position of line C-D is assumed to be a first position P1 shown in FIG. 3. FIG. 4(b) is a cross-sectional view on line E-F. A position of line E-F is assumed to be a second position P2 shown in FIG. 3.

As shown in FIG. 4(a), the organic insulating film 21 has a uniform thickness T1 at the first position P1. In addition, the first distance D1 is uniform at the first position P1. The display device DSP has a first spacer SP1 at the first position P1. The first spacer SP1 has a height H1. Such a spacer form a predetermined cell gap between the first substrate SUB1 and the second substrate SUB2 and is, for example, arranged for each pixel PX. As shown in FIG. 4(b), the organic insulating film 21 has a uniform thickness T2 at the second position P2. In addition, the second distance D2 is uniform at the second position P2. In the embodiments, the thickness of the organic insulating film 21 and the interelectrode distance D are uniform in a direction perpendicular to the direction from the incident side to the anti-incident side. In other words, the thickness of the organic insulating film 21 and the interelectrode distance D change depending on the position, in the Y-Z section of the display device DSP shown in FIG. 1, but the thickness of the organic insulating film 21 and the interelectrode distance D are constant in the X-Z section. The display device DSP has a second spacer SP2 at the second position P2. The second spacer SP2 has a height H2. The height H1 of the first spacer SP1 is larger than the height H2 of the second spacer SP2. That is, the height of the spacer decreases from the incident side to the anti-incident side, similarly to the interelectrode distance.

In the embodiments, the interelectrode distance is adjusted in accordance with the shape of the organic insulating film 21, but may be adjusted in accordance with the height of the spacer. In this case, the thickness of the organic insulating film 21 may or may not be uniform from the incident side to the anti-incident side. In addition, the organic insulating film for adjusting the interelectrode distance may be formed on not the second substrate SUB2, but the first substrate SUB1, which will be described later. Alternatively, organic insulating films may be formed on both the first substrate SUB1 and the second substrate SUB2. The degree of reducing the interelectrode distance from the incident side to the anti-incident side can be arbitrarily changed according to the application.

Figure 5:
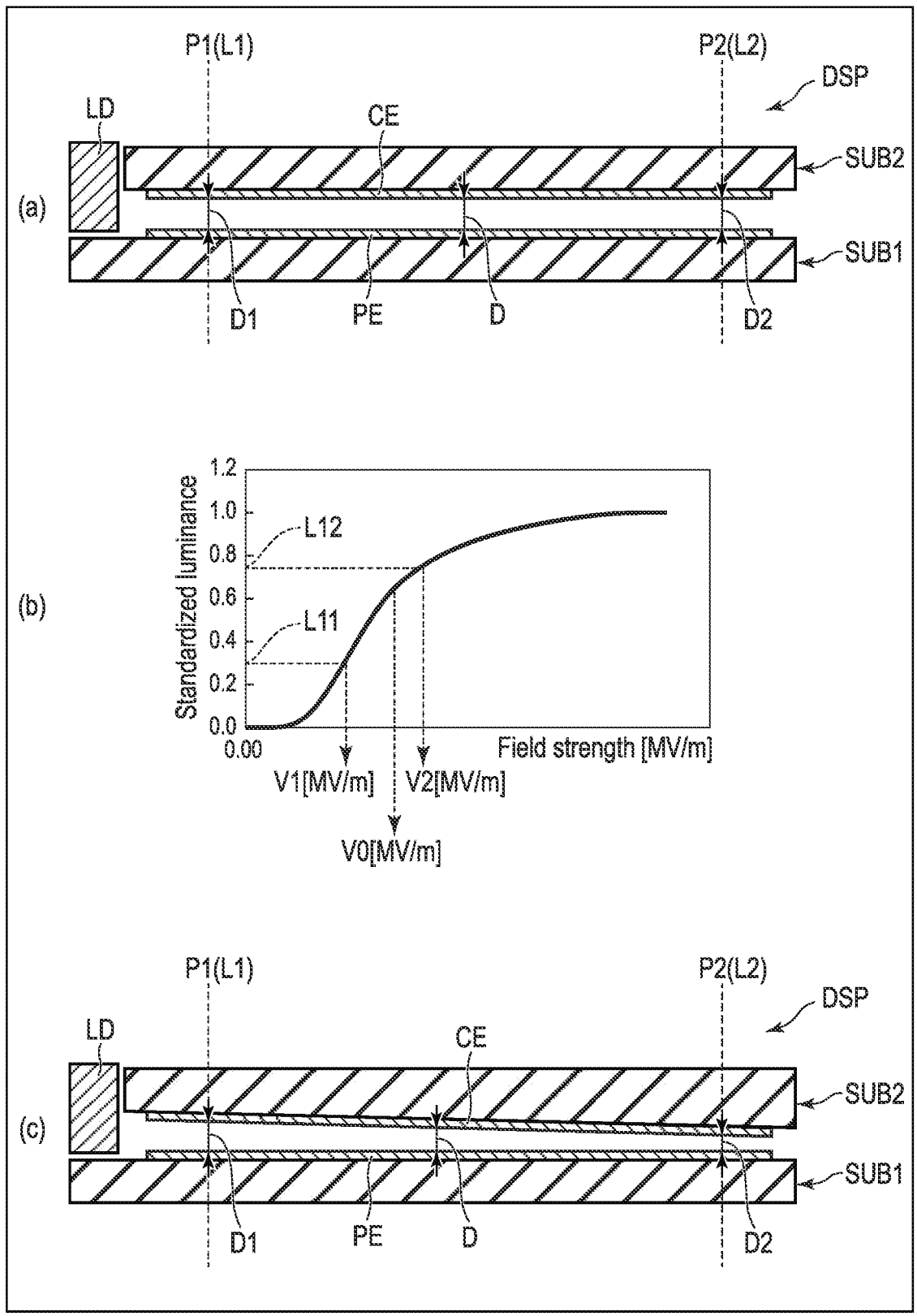
FIG. 5 is a diagram showing a relationship among the interelectrode distance, the field strength, and standardized luminance.

FIG. 5 is a diagram showing a relationship among the interelectrode distance, the field strength, and standardized luminance.

FIG. 5(a) shows a case where the interelectrode distance D is uniform from the incident side to the anti-incident side.

That is, the first distance D1 is equal to the second distance D2. For example, the uniform interelectrode distance D is approximately 3 μm. At this time, the ratio between the luminance L1 at the first position P1 and the luminance L2 at the second position P2 is 5:2. The luminance L2 of the second position P2 is reduced by 60% with respect to the luminance L1 of the first position P1. In order for the luminance to be visually recognized uniformly, the first distance D1 and the second distance D2 may be set such that the luminance L1 and L2 is 2:5 when it is assumed that the luminance does not decrease.

FIG. 5(b) is a graph showing the relationship between the field strength and the standardized luminance.

The lateral axis of the graph indicates the field strength [MV/m], and the longitudinal axis of the graph indicates the standardized luminance. The field strength is assumed to be V0 in a case where the interelectrode distance D shown in FIG. 5(a) is 3 μm. When the interelectrode distance D is smaller than 3 μm, the field strength becomes larger than the field strength V0 and the standardized luminance also increases. In addition, when the interelectrode distance D is larger than 3 μm, the field strength becomes smaller than the field strength V0 and the standardized luminance also decreases. In this example, the field strength V1 smaller than the field strength V0 is set to be applied to the first position P1, and the field strength V2 larger than the field strength V0 is set to be applied to the second position P2. If it is assumed that the luminance does not decrease from the incident side to the anti-incident side, the standardized luminance L11 is obtained at the first position P1 when the field strength is V1, and the standardized luminance L12 is obtained at the second position P2 when the field intensity is V2. The ratio between the standardized luminance L11 and L12 becomes a numerical value close to 2:5.

FIG. 5(c) shows a case where the interelectrode distance D decreases from the incident side to the anti-incident side. At the first position P1, the interelectrode distance D is set to the first distance D1 where the field strength V1 can be obtained. In addition, at the second position P2, the interelectrode distance D is set to the second distance D2 where the field strength V2 can be obtained. At this time, for example, the first distance D1 is larger than 3 μm, and the second distance D2 is smaller than 3 μm. For example, the first distance D1 is about 4.4 μm and the second distance D2 is about 2.5 μm. Even when a uniform voltage is applied, the field strength increases from the incident side to the anti-incident side and the visually recognized luminance can be made uniform by adjusting the interelectrode distance in this manner.

Second Configuration Example

Figure 6:
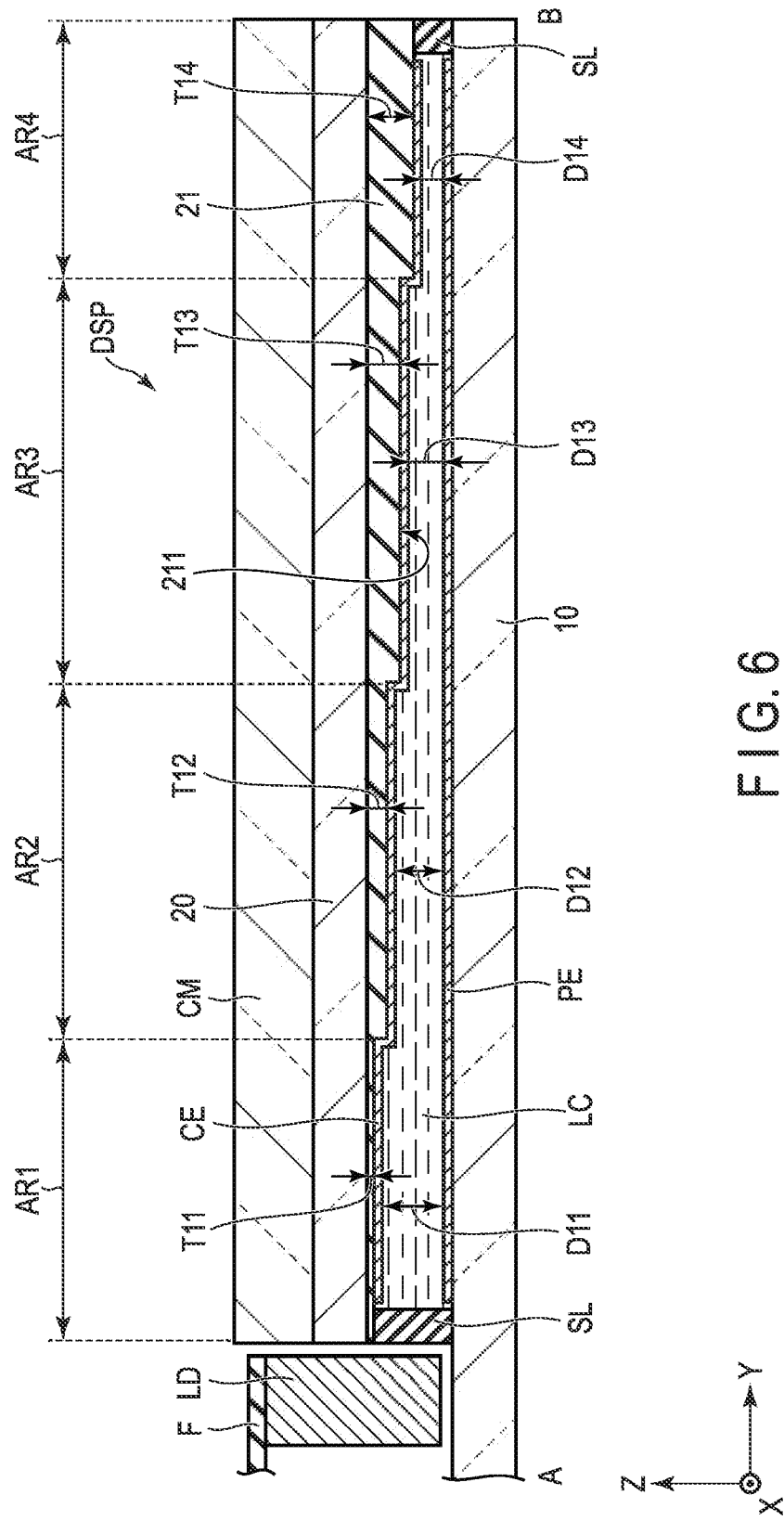
FIG. 6 is a cross-sectional view showing a second configuration example of the display device.

FIG. 6 is a cross-sectional view showing a second configuration example of the display device DSP. The display device DSP shown in FIG. 6 has a different shape of the organic insulating film 21 as compared with the display device DSP shown in FIG. 3.

The thickness of the organic insulating film 21 gradually increases from the incident side to the anti-incident side. The organic insulating film 21 has a thickness T11 in the first region AR1, a thickness T12 in the second region AR2, a thickness T13 in the third region AR3, and a thickness T14 in the fourth region AR4. The thickness T12 is larger than T11, the thickness T13 is larger than the thickness T12, and the thickness T14 is larger than the thickness T13. That is, the surface 211 is formed in a stepped shape. Due to the shape of the organic insulating film 21, the interelectrode distance D gradually decreases from the incident side to the anti-incident side. The display device DSP has an interelectrode distance D11 in the first region AR1, an interelectrode distance D12 in the second region AR2, an interelectrode distance D13 in the third region AR3, and an interelectrode distance D14 in the fourth region AR4. The interelectrode distance D12 is smaller than the interelectrode distance D11, the interelectrode distance D13 is smaller than the interelectrode distance D12, and the interelectrode distance D14 is smaller than the interelectrode distance D13. In the example illustrated, the organic insulating film 21 has the thickness in 4 steps, but may have the thickness in 3 steps or less or 5 steps or more.

In the second configuration example, too, the same advantages as those of the first configuration example can be obtained.

Third Configuration Example

Figure 7:
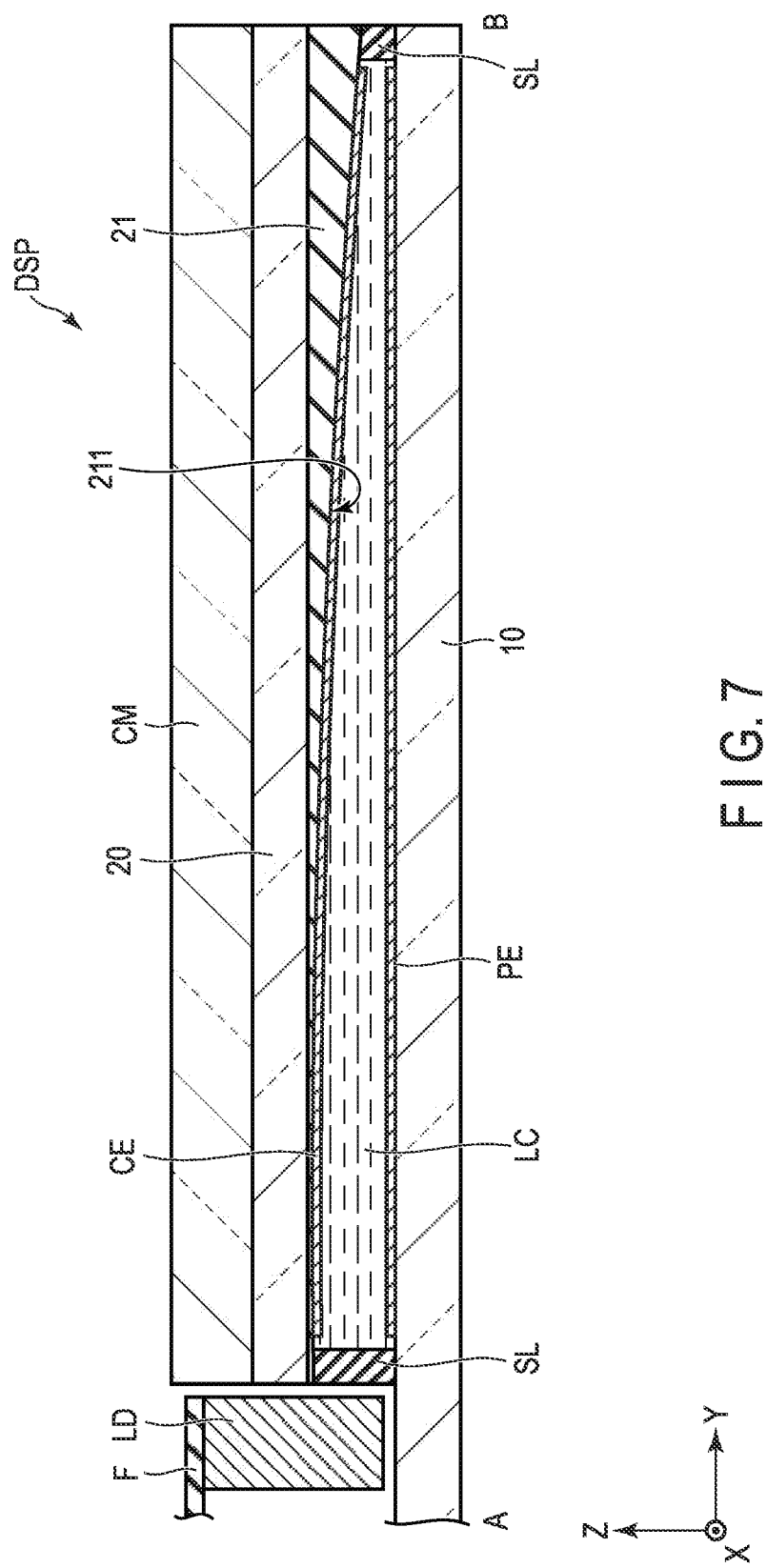
FIG. 7 is a cross-sectional view showing a third configuration example of the display device.

FIG. 7 is a cross-sectional view showing a third configuration example of the display device DSP. The display device DSP shown in FIG. 7 has a different shape of the organic insulating film 21 as compared with the display device DSP shown in FIG. 3.

A surface 211 of the organic insulating film 21 is curved and recessed toward the transparent substrate 20 side.

In the third configuration example, too, the same advantages as those of the first configuration example can be obtained.

Fourth Configuration Example

FIG. 8 is a cross-sectional view showing a fourth configuration example of the display device DSP. The display device DSP shown in FIG. 8 is different from the display device DSP shown in FIG. 3 in that the interelectrode distance is adjusted by not the organic insulating film of the second substrate SUB2, but the organic insulating film 11 of the first substrate SUB1.

The organic insulating film 11 has a thickness T21 at the first position P1 and a thickness T22 at the second position P2. The thickness T21 is smaller than the thickness T22. The thickness of the organic insulating film 11 increases as the distance from the light emitting element LD increases. For this reason, the surface 111 of the organic insulating film 11 on the second substrate SUB2 side is slanted to the transparent substrate 10. Due to such a shape of the organic insulating film 11, the interelectrode distance D becomes smaller as the distance from the light emitting element LD increases. The second distance D2 is smaller than the first distance D1.

As shown in FIG. 3 and FIG. 8, at least one of the first substrate SUB1 and the second substrate SUB2 includes an organic insulating film, and the thickness at the first position P1 of the organic insulating film is smaller than the thickness at the second position P2 of the organic insulating film.

Figure 9:
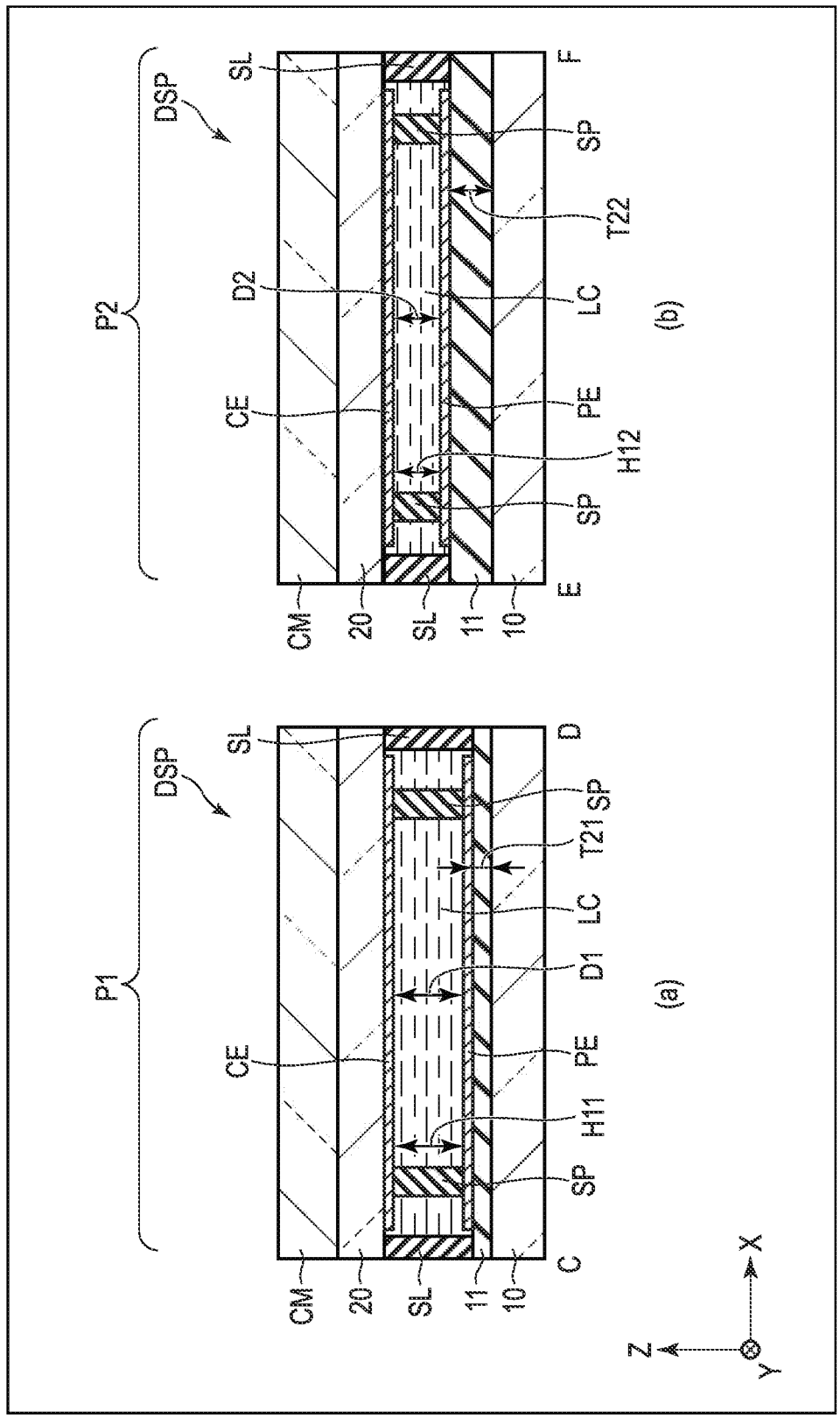
FIG. 9 is a cross-sectional view schematically showing the display device taken along line C-D and line E-F shown in FIG. 1.

FIG. 9 is a cross-sectional view schematically showing the display device DSP on lines C-D and E-F shown in FIG. 1. FIG. 9(a) is a cross-sectional view on line C-D. A position of line C-D is assumed to be a first position P1 shown in FIG. 8. FIG. 9(b) is a cross-sectional view on line E-F. A position of line E-F is assumed to be a second position P2 shown in FIG. 8.

As shown in FIG. 9(a), the organic insulating film 11 has a uniform thickness T21 at the first position P1. In addition, the first distance D1 is uniform at the first position P1. The first spacer SP1 has a height H11. As shown in FIG. 9(b), the organic insulating film 11 has a uniform thickness T22 at the second position P2. In addition, the second distance D2 is uniform at the second position P2. The second spacer SP2 has a height H12. The height H11 of the first spacer SP1 is larger than the height H12 of the second spacer SP2. The height of the spacer decreases from the incident side to the anti-incident side, similarly to the interelectrode distance.

In the fourth configuration example, too, the same advantages as those of the first configuration example can be obtained. The shape of the organic insulating film 11 of the fourth configuration example may be formed to be a stepped shape as shown in FIG. 6, or a recessed shape as shown in FIG. 7.

Fifth Configuration Example

FIG. 10 is a cross-sectional view showing a fifth configuration example of the display device DSP. The display device DSP shown in FIG. 10 is different from the display device DSP shown in FIG. 3 in that the interelectrode distance by both the organic insulating film 21 of the second substrate SUB2 and the organic insulating film 11 of the first substrate SUB1.

The organic insulating film 11 has a thickness T31 at the first position P1 and a thickness T32 at the second position P2. The thickness T31 is smaller than the thickness T32. The thickness of the organic insulating film 11 increases as the distance from the light emitting element LD increases. For this reason, the surface 111 of the organic insulating film 11 on the second substrate SUB2 side is slanted to the transparent substrate 10. The organic insulating film 21 has a thickness T41 at the first position P1 and a thickness T42 at the second position P2. The thickness T41 is smaller than the thickness T42. The thickness of the organic insulating film 21 increases as the distance from the light emitting element LD increases. For this reason, a surface 211 of the organic insulating film 21 on the first substrate SUB1 side is slanted to the transparent substrate 20. Due to such shapes of the organic insulating films 11 and 21, the interelectrode distance D becomes smaller as the distance from the light emitting element LD increases. The second distance D2 is smaller than the first distance D1.

FIG. 11 is a cross-sectional view schematically showing the display device DSP on lines C-D and E-F shown in FIG. 1. FIG. 11(a) is a cross-sectional view on line C-D. A position of line C-D is assumed to be a first position P1 shown in FIG. 10. FIG. 11(b) is a cross-sectional view on line E-F. A position of line E-F is assumed to be a second position P2 shown in FIG. 10.

As shown in FIG. 11(a), the organic insulating film 11 has a uniform thickness T31, and the organic insulating film 21 has a uniform thickness T41, at the first position P1. In addition, the first distance D1 is uniform at the first position P1. The first spacer SP1 has a height H21. As shown in FIG. 11(b), the organic insulating film 11 has a uniform thickness T32, and the organic insulating film 21 has a uniform thickness T42, at the second position P2. In addition, the second distance D2 is uniform at the second position P2. The second spacer SP2 has a height H22. The height H21 of the first spacer SP1 is larger than the height H22 of the second spacer SP2. The height of the spacer decreases from the incident side to the anti-incident side, similarly to the interelectrode distance.

In the fifth configuration example, too, the same advantages as those of the first configuration example can be obtained. The shapes of the organic insulating films 11 and 21 of the fifth configuration example may be formed to be the stepped shape as shown in FIG. 6 or the recessed shape as shown in FIG. 7.

Sixth Configuration Example

Figure 12:
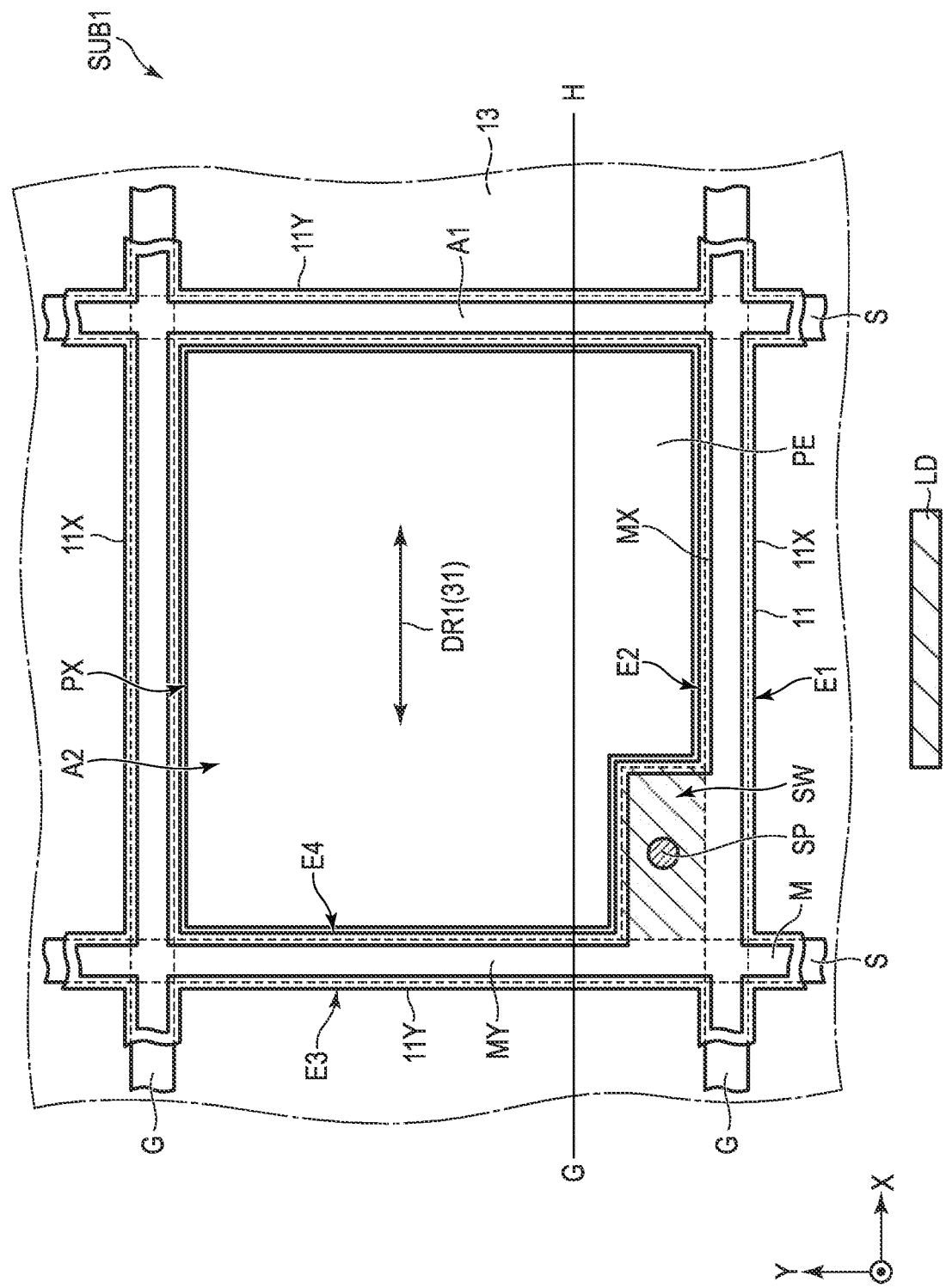
FIG. 12 is a cross-sectional view showing a sixth configuration example of the display device.

FIG. 12 is a cross-sectional view showing a sixth configuration example of the display device DSP. The sixth configuration example is different from the first configuration example in that the organic insulating film 11 of the first substrate SUB1 is arranged at a position overlaid on the scanning line G, the signal line S, and the switching element SW, but is not arranged at a position overlaid on the pixel electrode PE.

FIG. 12 shows the configuration of the first substrate SUB1 of the pixel PX. The first substrate SUB1 comprises scanning lines G, signal lines S intersecting the scanning lines G, the switching element SW electrically connected to the scanning lines G and the signal lines S, a metal line M, the organic insulating film 11, the capacitive electrode 13, the pixel electrode PE and the like.

Two scanning lines G extend in the first direction X to be arranged in the second direction Y with an interval. Two signal lines S extend in the second direction Y to be arranged in the first direction X with an interval. The pixel PX corresponds to a region partitioned by two signal lines S and two scanning lines G. The switching element SW is arranged at an intersection of the gate line G and the source line S.

The organic insulating film 11 is patterned and formed in a grating shape in planar view. That is, the organic insulating film 11 is overlaid on each of the gate lines G, the source lines S, and the switching element SW. The organic insulating film 11 includes first parts 11X overlaid on the scanning lines G and second parts 11Y overlaid on the signal lines S. The first part 11X has a first side surface E1 close to the light emitting element LD and a second side surface E2 on the opposite side of the first side surface E1. The first side surface E1 and the second side surface E2 extend along the extension direction DR1 of the polymer 31. The second part 11Y has a third side surface E3 and a fourth side surface E4 on the opposite side of the third side surface E3.

In FIG. 12, a region in which the organic insulating film 11 is arranged is referred to as a first region A1 of the first substrate SUB1, and a region in which the organic insulating film 11 is not arranged is referred to as a second region A2 of the first substrate SUB1. The second region A2 is located on an inner side surrounded by the first region A1.

The metal line M is arranged in the first region A1 and formed in a grating shape in planar view. That is, the metal line ML is overlaid on each of the scanning line G, the signal line S, and the switching element SW. The metal line M includes a first wiring part MX overlaid on the scanning line G and the first part 11X, and a second wiring part MY overlaid on the signal line S and the second part 11Y.

The capacitive electrode 13 is arranged over a plurality of pixels PX as represented by a one-dot chain line, and further arranged over a substantially entire area of the first substrate SUB1. That is, the capacitance electrode 13 is arranged in each of the first region A1 and the second region A2. The capacitive electrode 13 is overlaid on each of the switching element SW, the scanning line G, the signal line S, and the organic insulating film 11 in the first region A1.

The pixel electrode PE is overlaid on the capacitance electrode 13 in the second region A2. In the example shown in FIG. 12, the pixel electrode PE is provided inside the region where the organic insulating film 11 is arranged. The pixel electrode PE may be provided to be overlaid on each of the first part 11X and the second part 11Y. In the example shown in FIG. 12, the spacer SP is overlaid on the switching element SW.

Figure 13:
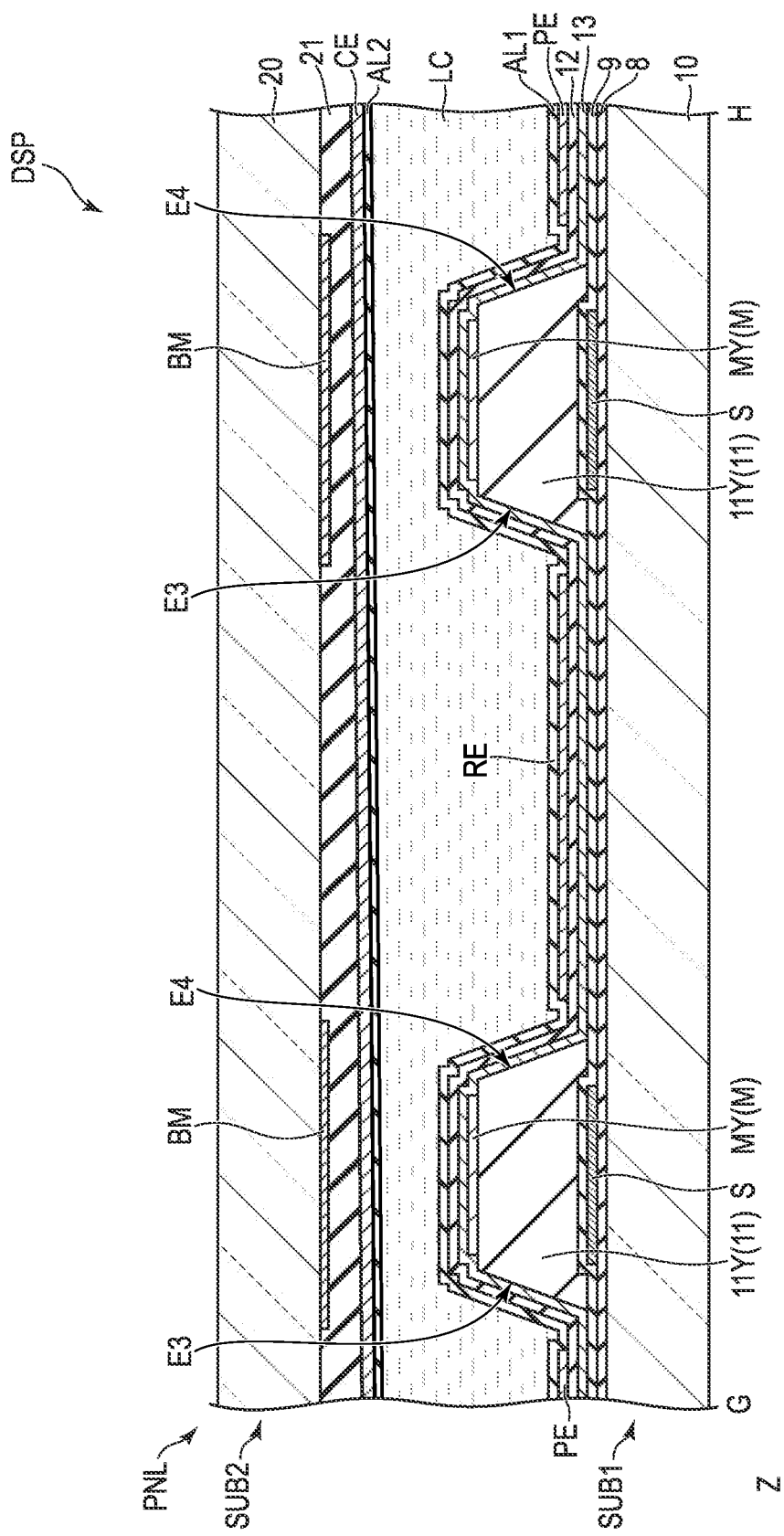
FIG. 13 is a cross-sectional view schematically showing the display device taken along line G-H shown in FIG. 12.

FIG. 13 is a cross-sectional view schematically showing the display device DSP on line G-H shown in FIG. 12. In addition to the configuration shown in FIG. 2, FIG. 13 illustrates the signal lines S, the insulating films 8 and 9, and the metal lines M on the first substrate SUB1, and illustrates the light-shielding layer BM on the second substrate SUB2.

The insulating film 8 covers the transparent substrate 10. The other conductive layer (light-shielding layer or reflective layer) formed of the same material as the scanning line G may be provided between the insulating film 8 and the transparent substrate 10. The signal line S are formed on the insulating layer 11. The signal line S is located between the pixel electrodes PE adjacent in the first direction X. The insulating film 9 covers the signal lines S and the insulating film 8.

The organic insulating film 11 is located on the insulating film 9. The second part 11Y of the organic insulating film 11 is located directly above the signal line S and is located between the pixel electrodes PE adjacent in the first direction X. The third side surface E3 and the fourth side surface E4 of the second part 11Y are covered with the capacitance electrode 13. Each of the third side surface E3 and the fourth side surface E4 is located between the signal line S and the pixel electrode PE along the first direction X. In the sixth configuration example, the organic insulating film 11 is not provided between the transparent substrate 10 and the pixel electrode PE. For this reason, the total volume of the organic insulating film 11 is smaller than that in the case where the organic insulating film 11 is provided between the transparent substrate 10 and the pixel electrode PE (or the entire area of the display portion DA). As a result, since the probability that the light propagating through the display panel PNL is made incident on the organic insulating film 11 is reduced, the light absorption by the organic insulating film 11 can be suppressed. Deterioration in display quality can be therefore suppressed. The second wiring parts MY of the metal lines M are located on the organic insulating film 11. The second wiring parts MY are located directly above the signal lines S. In addition, the second wiring parts MY are in contact with the capacitance electrode 13 and are electrically connected to each other. The second part 11Y is located between the signal line S and the second wiring part MY.

In the second substrate SUB2, the light-shielding layer BM is located between the transparent substrate 20 and the organic insulating film 21. The light-shielding layer BM is located directly above the third side surface E3 and the fourth side surface E4 of the second part 11Y, and directly above the signal line S. In the sixth configuration example, the organic insulating film 21 may have a configuration described in the first to third configuration examples.

In the sixth configuration example, too, the same advantages as those of the first configuration example can be obtained.

As described above, a display device capable of suppressing the deterioration in display quality can be provided by the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Examples of the display device obtained from the configurations disclosed herein will be added below.

(1)

A display device comprising:
a first substrate including a pixel electrode;
a second substrate including a common electrode;
a liquid crystal layer located between the first substrate and the second substrate and containing polymer and liquid crystal molecules; and
a light emitting element opposed to an end surface of the second substrate, wherein
the common electrode is separated from the pixel electrode by a first distance, at a first position,
the common electrode is separated from the pixel electrode by a second distance, at a second position more separated from the light emitting element than the first position, and
the second distance is smaller than the first distance.

(2)

The display device of (1), wherein
the second substrate includes a first base substrate, and a first organic insulating film located between the first base substrate and the common electrode, and
a thickness of the first organic insulating film at the first position is smaller than a thickness of the first organic insulating film at the second position.

(3)

The display device of (2), wherein
the thickness of the first organic insulating film gradually increases from the first position to the second position.

(4)

The display device of (2), wherein
a surface of the first organic insulating film on the first substrate side has a stepped shape.

(5)

The display device of (2), wherein
a surface of the first organic insulating film on the first substrate side is curved.

(6)

The display device of (1), further comprising:
a first spacer at the first position and a second spacer at the second position,
wherein
a height of the first spacer is larger than a height of the second spacer.

(7)

The display device of (1), wherein
the first substrate includes a second base substrate, and a second organic insulating film located between the second base substrate and the pixel electrode, and
a thickness of the second organic insulating film at the first position is smaller than a thickness of the second organic insulating film at the second position.

(8)

The display device of (7), wherein
the second substrate includes a first base substrate, and a first organic insulating film located between the first base substrate and the common electrode, and
a thickness of the first organic insulating film at the first position is smaller than a thickness of the first organic insulating film at the second position.

(9)

The display device of (1), wherein
the first substrate includes a second base substrate, and comprises a scanning line, a signal line intersecting the scanning line, a switching element electrically connected to the scanning line and the signal line, and a second organic insulating film overlaid on the switching element, on the second base substrate, and
the second organic insulating film is not provided between the second base substrate and the pixel electrode.

(10)

The display device of (9), wherein
the second organic insulating film is overlaid on the scanning line and the signal line.

(11)

The display device of (1), wherein
the first distance is longer than 3 μm and the second distance is smaller than 3 μm.

(12)

A display device comprising:
a first substrate including a first electrode;
a second substrate having a second electrode, a first end surface, and a second end surface on an opposite side to the first end surface;
a liquid crystal layer located between the first substrate and the second substrate; and
a light emitting element opposed to the first end surface, wherein
the second substrate has a first position and a second position located between the first position and the second end surface, and
a distance between the first electrode and the second electrode at the first position is larger than a distance between the first electrode and the second electrode at the second position.

(13)

The display device of (12), wherein
the distance between the first electrode and the second electrode gradually decreases from the first position to the second position.

(14)

The display device of (12), wherein
the first substrate includes a second base substrate, and a second organic insulating film located between the second base substrate and the first electrode,
a thickness of the second organic insulating film at the first position is smaller than a thickness of the second organic insulating film at the second position,
the second substrate includes a first base substrate, and a first organic insulating film located between the first base substrate and the second electrode, and
a thickness of the first organic insulating film at the first position is smaller than a thickness of the first organic insulating film at the second position.

(15)

The display device of (12), wherein
the liquid crystal layer is sealed between the first substrate and the second substrate by a seal, and
the light emitting element is opposed to the seal.

(16)

A display device comprising:
a first substrate;
a second substrate having a first end surface and a second end surface on an opposite side to the first end surface;
a liquid crystal layer sealed between the first substrate and the second substrate by a seal; and a light emitting element opposed to a seal located on the first end surface side, in a direction from the first end surface to the second end surface, wherein a thickness of a seal located on the first end surface side is larger than a thickness of a seal located on the second end surface.

(17) The display device of (16), wherein the light emitting element is opposed to the first end surface.

(18) The display device of (16), wherein a thickness of the liquid crystal layer gradually decreases from the first end surface to the second end surface.

(19) The display device of (16), wherein the first substrate includes a first electrode, a second base substrate, and a second organic insulating film located between the second base substrate and the first electrode, a thickness of the second organic insulating film at a first position is smaller than a thickness of the second organic insulating film at a second position, the second substrate includes a second electrode, a first base substrate, and a first organic insulating film located between the first base substrate and the second electrode, and a thickness of the first organic insulating film at the first position is smaller than a thickness of the first organic insulating film at the second position.

(20) The display device of (16), wherein the first substrate includes a plurality of first electrodes, the second substrate includes at least one second electrode, the liquid crystal layer contains polymer dispersed liquid crystal, and a scattered state of light incident on the liquid crystal layer from the light emitting element is changed by a voltage applied between the first electrode and the second electrode.

What is claimed is:

1. A display device comprising:

a first substrate including a first base substrate including a first main surface, and a pixel electrode disposed on the first main surface;

a second substrate opposed to the first substrate and including a second base substrate including a second main surface which is opposed to the first main surface, and a common electrode disposed on the second main surface, the second substrate including a first side surface, and a second side surface which is on an opposite side to the first side surface;

a liquid crystal layer located between the first main surface and the second main surface and containing polymer and liquid crystal molecules; and a light emitting element opposed to the first side surface, wherein the common electrode has a first end part and a second end part on an opposite side to the first end part, the first end part being closer to the first side surface than the second end part, the pixel electrode has a third end part and a fourth end part on an opposite side to the third end part, the third end part being closer to the first side surface than the fourth end part, the first end part and the third end part oppose each other at a first position, the second end part and the fourth end part oppose each other at a second position, a distance between the first end part and the third end part is greater than a distance between the second end part and the fourth end part, the first side surface and the second side surface intersect the second main surface, and the second main surface is a flat surface from the first side surface to the second side surface.

2. The display device of claim 1, wherein the second substrate includes a first organic insulating film located between the second base substrate and the common electrode, and a thickness of the first organic insulating film at the first position is smaller than a thickness of the first organic insulating film at the second position.

3. The display device of claim 2, wherein the thickness of the first organic insulating film gradually increases from the first position to the second position.

4. The display device of claim 2, wherein a surface of the first organic insulating film on the first substrate side has a stepped shape between the first position and the second position.

5. The display device of claim 2, wherein a surface of the first organic insulating film on the first substrate side is curved.

6. The display device of claim 1, further comprising:

a first spacer at the first position and a second spacer at the second position, wherein a height of the first spacer is larger than a height of the second spacer.

7. The display device of claim 1, wherein the first substrate includes a second organic insulating film located between the first base substrate and the pixel electrode, and a thickness of the second organic insulating film at the first position is smaller than a thickness of the second organic insulating film at the second position.

8. The display device of claim 7, wherein the second substrate includes a first organic insulating film located between the second base substrate and the common electrode, and a thickness of the first organic insulating film at the first position is smaller than a thickness of the first organic insulating film at the second position.

9. The display device of claim 1, wherein the first substrate includes a scanning line, a signal line intersecting the scanning line, a switching element electrically connected to the scanning line and the signal line, and a second organic insulating film overlaid on the switching element, on the first base substrate, and the second organic insulating film is not provided between the first base substrate and the pixel electrode.

10. The display device of claim 9, wherein the second organic insulating film is overlaid on the scanning line and the signal line.

11. The display device of claim 1, wherein the distance between the first end part and the third end part is longer than 3 μm and the distance between the second end part and the fourth end part is smaller than 3 μm.

* * * * *